United States Patent [19]

Strauss

[11] Patent Number: 5,237,459
[45] Date of Patent: Aug. 17, 1993

[54] VEHICULAR VISUAL SAFETY DEVICE

[76] Inventor: Arthur Strauss, 16 Millstone Dr., Marlborough, Conn. 06447

[21] Appl. No.: 695,964

[22] Filed: May 6, 1991

[51] Int. Cl.$^5$ .......................... G02B 5/08; G02B 7/18; B60R 1/10

[52] U.S. Cl. .................... 359/863; 359/864; 359/881; 248/467; 248/481

[58] Field of Search ............... 350/612, 616, 618, 623, 350/624, 625, 626, 632, 639; 248/467, 474, 480, 481, 484, 485; 359/850, 855, 856, 862, 864, 865, 872, 881, 863

[56] References Cited

U.S. PATENT DOCUMENTS

| | | |
|---|---|---|
| 1,666,236 | 4/1928 | Fuerth . |
| 1,748,837 | 2/1930 | Greensfelder ................ 359/863 |
| 1,768,191 | 6/1930 | Crook . |
| 1,870,468 | 8/1932 | Ross . |
| 1,918,802 | 7/1933 | Fleischer . |
| 2,197,280 | 4/1940 | Topping .................. 248/467 |
| 2,302,952 | 11/1942 | Pfeifer .................... 350/623 |
| 2,915,944 | 12/1959 | Butts ..................... 248/467 |
| 2,968,995 | 1/1961 | Holden .................. 248/467 |
| 4,624,539 | 11/1986 | King et al. .............. 248/467 |

FOREIGN PATENT DOCUMENTS

| | | | |
|---|---|---|---|
| 2630691 | 11/1989 | France ................. 350/612 |
| 0437670 | 6/1949 | Italy .................... 350/623 |
| 0483306 | 11/1954 | Italy .................... 350/623 |
| 0656651 | 10/1963 | Italy .................... 350/618 |
| 0275669 | 8/1951 | Switzerland ........... 350/618 |

*Primary Examiner*—Bruce Y. Arnold
*Assistant Examiner*—R. O. Shafer
*Attorney, Agent, or Firm*—Richard L. Strauss

[57] ABSTRACT

This specification relates to the invention of a vehicular visual safety device. The device utilizes a planar object, and an opposed convex reflecting mirror mounted on the inside surface of a vehicle windshield enabling the driver to see objects lateral, forward and below the level of the front windshield and front portion of the vehicle on the side of the vehicle opposite and lateral to the driver (passenger side) which heretofore encompassed a dangerous blind spots.

7 Claims, 4 Drawing Sheets

VEHICULAR VISUAL SAFETY DEVICE

TECHNICAL FIELD

This invention concerns a visual aid device which eliminates a dangerous blind spot located on the passenger side of vehicles.

BACKGROUND OF THE INVENTION

In the past, operators of motor vehicles have been unable to visualize the road forward of the drivers position and on the side of the vehicle opposite the operators position, (the "passenger side"). There has been a tragic history of accidents occurring where, for example, a truck driver has been unable to visualize a pedestrian afoot, on the passenger side of the truck as the truck either moved towards the pedestrian, or the pedestrian moved in front of the truck. These accidents occurred since the structure of the vehicle itself, especially that part of the vehicle extending from a point lateral and opposite to the driver, on the passenger side, and forward of the vehicle windshield below the level of vehicle's windshield created a dangerous blind spot. Side mounted mirror devices have been utilized in an attempt to eliminate this dangerous blind spot, but these devices, mounted outside the vehicle and forward of the windshield could only visualize a portion of the blind spot. U.S. Pat. No. 4,268,120 and U.S. Pat. No. 1,918,802 disclose such outside mounted devices. These devices allow a dangerous blind spot to remain in that area between the mirrors fender mounted position, and the front windshield of a vehicle, below that area obscured by the vehicles own structure. Furthermore, outside mounted devices of this type, due to their location outside of the vehicle, are subject to both maintenance problems and breakage.

U.S. Pat. No. 1,870,468 utilizes inside mirrors in order to eliminate the blind spot discussed above. This device utilizes up to four separate mounted mirrors and is easily subject to misalignment of the mirrors. Obstruction of the ricochet-like path of light the mirrors utilize by passengers and articles contained within the vehicle is also a problem. Furthermore, this system is not portable, and requires extensive adjustment by each driver utilizing a given vehicle.

What is needed is an easily transportable adjustable vehicular visual safety device that enables the driver to see objects lateral, forward and below the level of the front windshield and front portion of the vehicle on the side of the vehicle opposite and lateral to the driver (passenger side) which heretofore encompassed a dangerous blind spot.

SUMMARY OF THE INVENTION

A new device has now been invented that eliminates the dangerous blind spots on the passenger side of vehicles, lateral to and forward of the vehicle windshield on the side of the vehicle not occupied by the driver (the passenger side). The vehicular visual safety device comprises a convex object, and planar reflecting mirror mounted in an adjustable frame, said frame having a means for mounting the device on the inside surface of a vehicle windshield on the passenger side. The convex object mirror is directed so as to capture an image lateral and forward to the vehicular safety device's mounted position on the passenger side of the car windshield as well as below the level of the vehicles windshield and car body normally not visible to the driver. A planar reflecting mirror is adjusted within the adjustable frame so as to capture the image provided by the convex object mirror and reflect it to the driver of a vehicle in which it is mounted.

The vehicular visual safety device provides an image of the area on the passenger side of a vehicle normally hidden by the structure of the vehicle itself. This area is best described as lateral to a side of the car opposite the driver's position (the passenger side) forward of the vehicle front windshield ranging in elevation from ground level up to and including the lateral area not obscured by the vehicle.

The vehicular visual safety device is held in place against an inside surface of a vehicular windshield on the passenger side. In one embodiment of the present invention, suction cups formed of a resilient material provide adhesion of the device's frame. The device is provided with a means for adjusting the angulation of the object and reflecting mirrors so as to allow proper adjustment of the device for multiple drivers. The device is easily transportable from one vehicle to another so as to allow one device to serve many different vehicles as may be necessary in the trucking industry. The vehicular visual safety device may by configured for either right or left side operated vehicles.

DESCRIPTION OF THE PREFERRED EMBODIMENT

Figure 1:
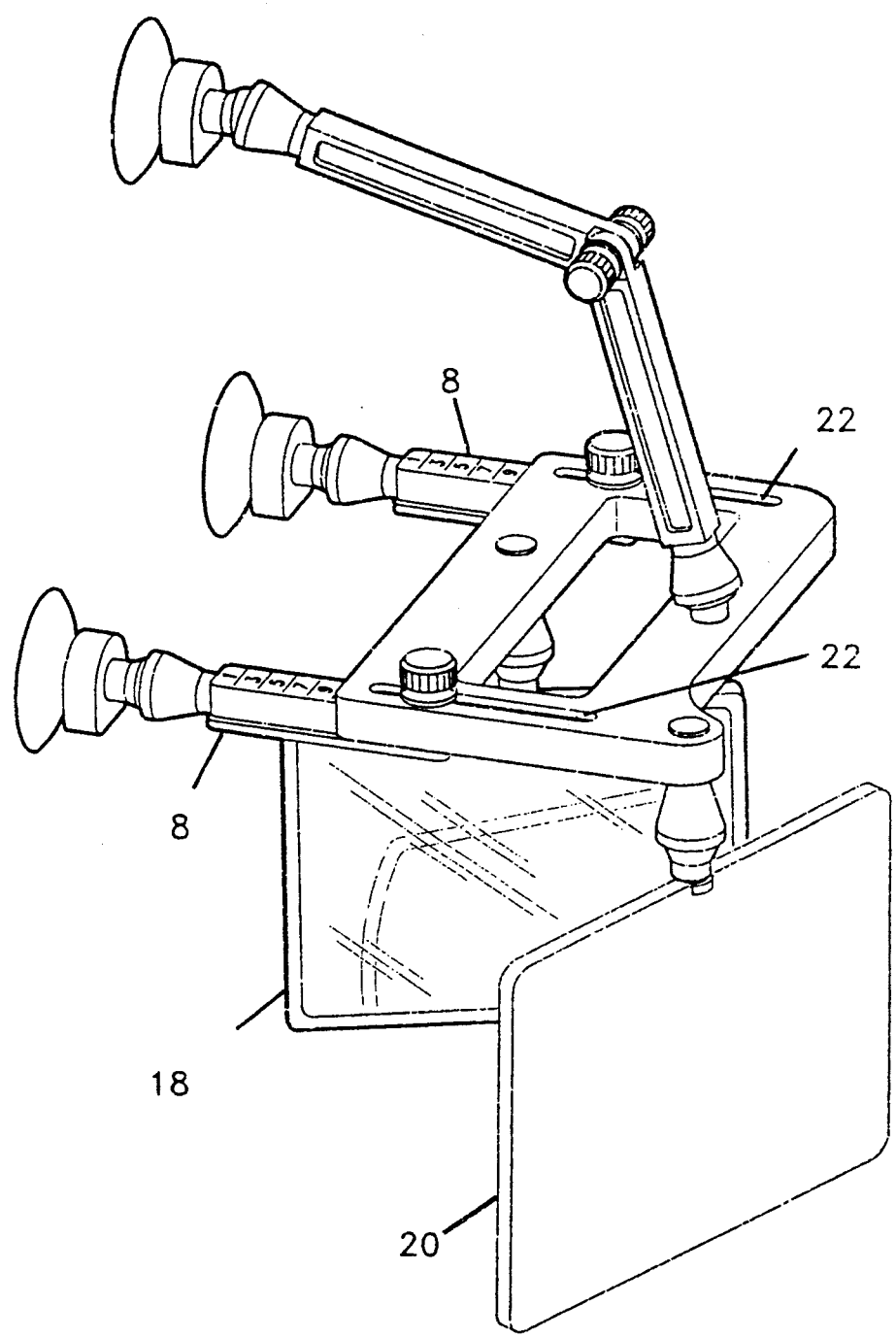
FIG. 1 is an isometice view of one embodiment of the visual safety device. The device as illustrated is drawn to actual 1:1 dimensions.
Figure 2:
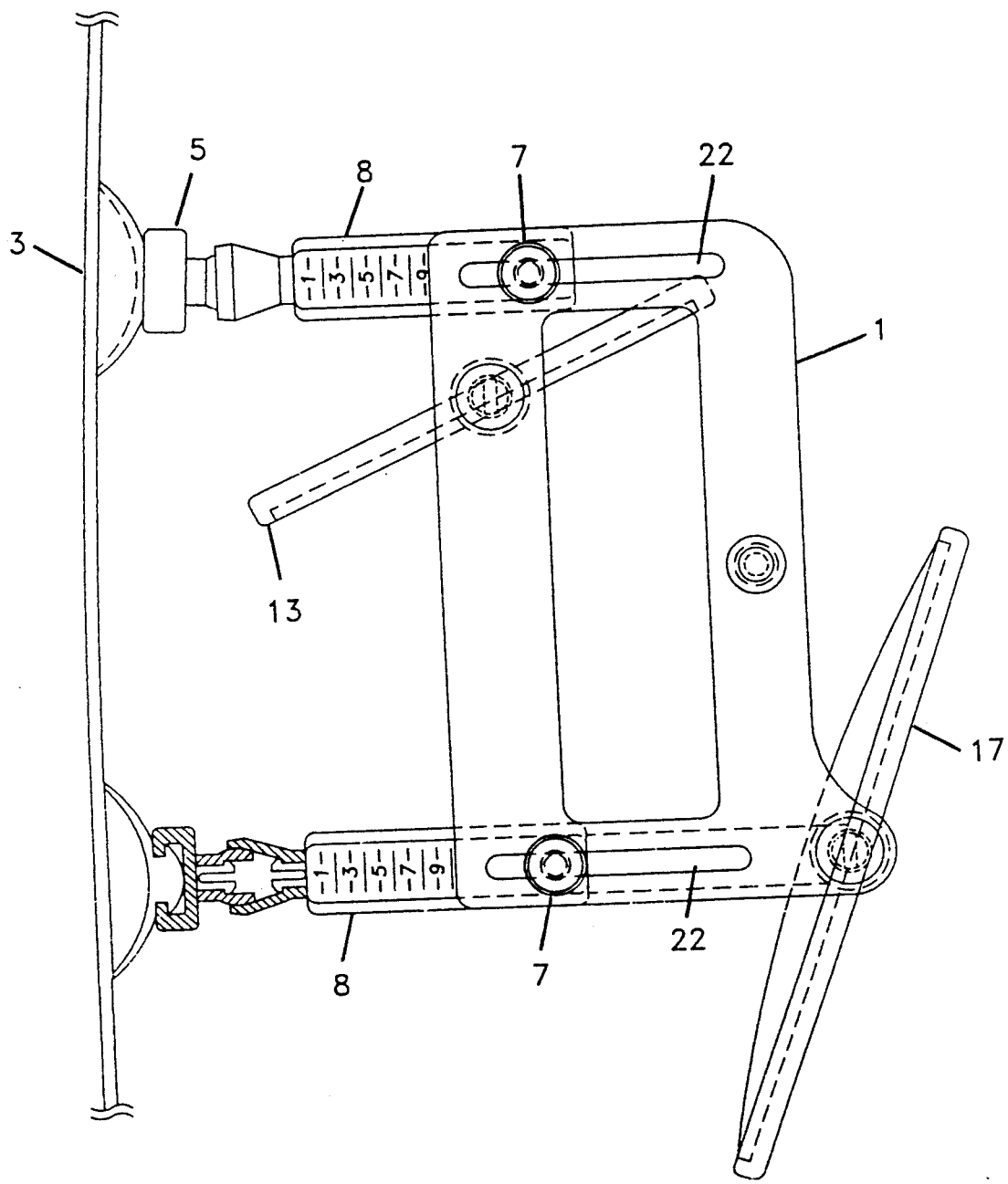
FIG. 2 is a top view of the visual safety device illustrated in FIG. 1. It is shown as fixed to a vehicular windshield as the device is actually intended to be utilized.
Figure 3:
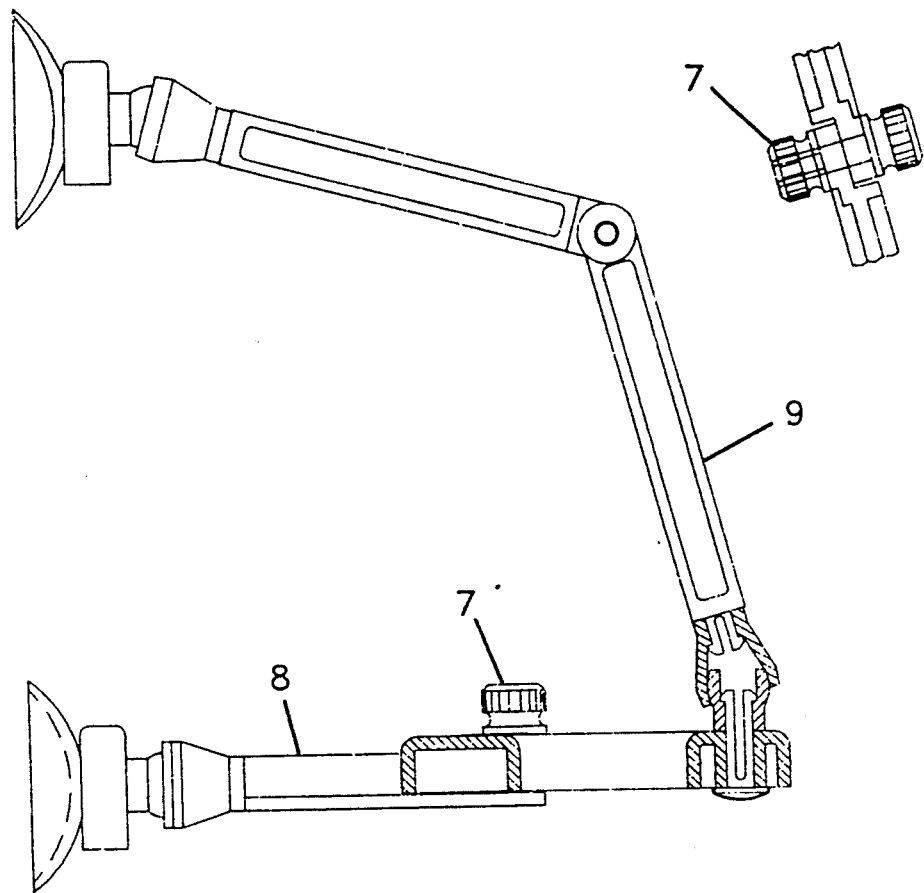
FIG. 3 is an isolated diagram showing the articulating arm element of the device.
Figure 4:
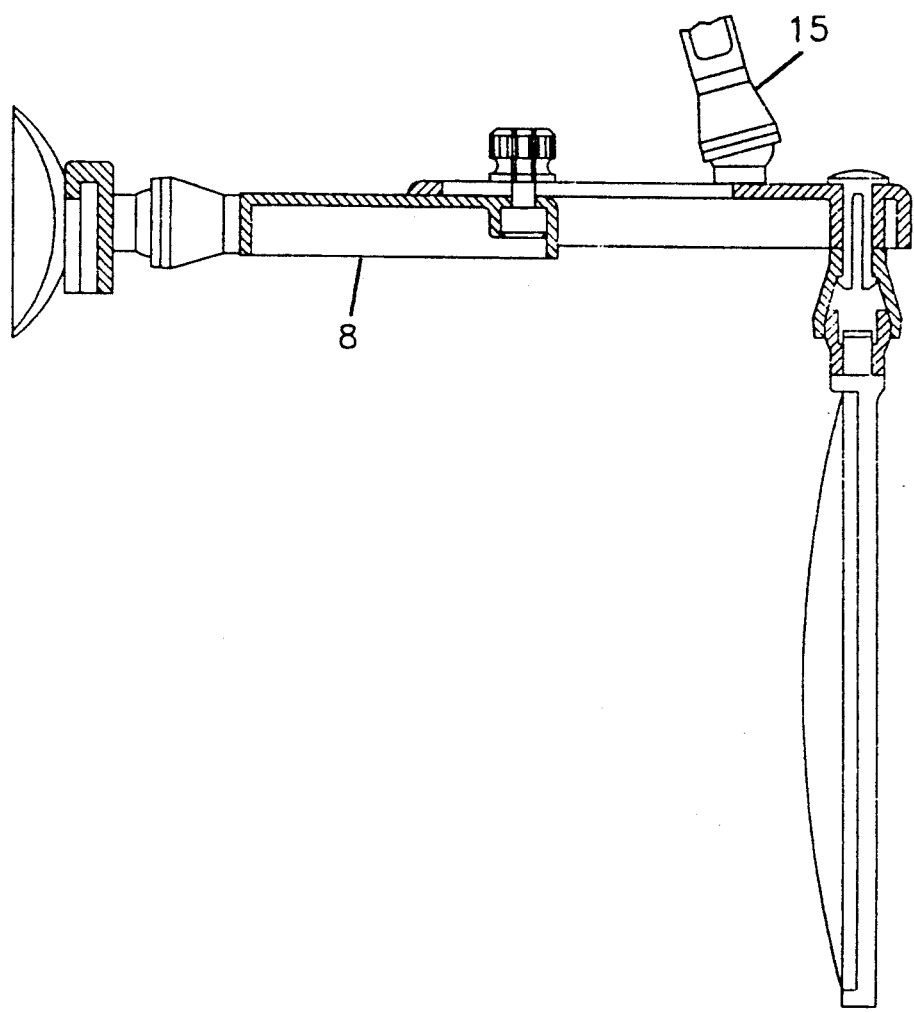
FIG. 4 illustrates one of two support arm elements utilized in one embodiment of the vehicular visual safety device. The diagram demonstrates a lateral view of the support arm element.

In one embodiment of the present invention the visual safety device is comprised of a main frame 1 held in place against the inside surface of an automobile windshield 3, on the passenger side (the side opposite and lateral to the driver), by resilient suction cups 5. The suction cups are mounted on the ends of two adjustable mounting arms 8, and one articulating support arm 9 which hold the main frame 1 in a fixed relation with said windshield. The position of the adjustable mounting arms and the articulating support arm may be adjusted by loosening an adjustment nut 7 and bolt 16 which passes through a slot 22 defined by the right and left lateral surfaces of the main frame. Thus, the nut and bolt maintain the position of the adjustable mounting arms and articulating support arms in relation to the main frame. Adjustment of the articulating support arm allows compensation for windshields of different rake. Suspended from the inferior surface of the main frame is a planar reflecting mirror 13, into which the driver operator of the vehicle looks in order to visualize the blind spot area. The reflecting mirror is adjustable by means of a ball and socket joint 15 and is adjusted to reflect the image of a forward looking object convex mirror 17 which captures light lateral and forward of the passenger side of the vehicle including that area normally obscured by the vehicle's own structure.

This arrangement of mirrors, supporting arms, articulating arm and main frame will allow a driver, seated at the vehicles controls to visualize objects normally hidden by obstructions in front of the driver, or the obstruction of the vehicles own structure lateral to the passenger side of the vehicle forward of the front windshield. Full adjustment is accomplished in the device by utilizing ball and socket type joints for the mounting of the mirrors of the device and for the mounting of the suction cups to the articulating support arms and the adjustable mounting arms.

The vehicular visual safety device is comprised of a main frame unit, 2 adjustable mounting arms, an articulating support arm, a convex reflecting mirror, and a planar object mirror. The main frame, the adjustable mounting arms, and the articulating support arm may be made of any suitable material such as: acrylic resin, aluminum, alloy steel. A preferred composition of clear acrylic resin is utilized in one embodiment so as to create the least obstruction of driver vision.

The mirror elements may be fabricated from glass or optical quality mirrored acrylic resin. The ball and socket joints utilized in the device may be fabricated of any suitable material such as plastic resin or alloy steel.

In the preferred embodiment of the present invention, the dimensions of the planar mirror are within a range of about 2.5 to 4.5 inches in height and from about 4.5 to about 6.5 inches in width. In the preferred embodiment, the preferred spherical radius of the object mirror is about 7.5 to 9.5 inches. The dimensions of the object mirror may range in width from about 4.5 to 6.5 inches and a height from about 3 to 5 inches. The planar and the object mirror are both mounted within a mirror housing frame, 18 and 20 respectively.

The foregoing description of the preferred embodiment is for descriptive purposes only, and the invention is not to be limited by said description but rather encompasses the full description as presented in the claims.

I claim:

1. A vehicular visual safety device comprising:
   a main frame, said frame having a superior, inferior, forward, aft, right lateral, and left lateral surface;
   a means for affixing said main frame to an inside surface of a vehicular windshield on a passenger side of a vehicle;
   a convex object mirror affixed to the inferior surface of said main frame with an adjustable fixation means so that said convex object mirror is adjustable so as to face the area lateral to the vehicle in which said main frame is mounted on the passenger side forward and lateral to the convex object mirror;
   a planar reflecting mirror affixed to the inferior surface of the main frame and said reflecting mirror provided with an adjustable fixation means so as to allow said reflecting mirror to reflect an image provided by said convex object mirror; wherein the convex object mirror has a spherical radius of curvature sufficient to transmit an image of an area lateral, forward and below the windshield on the passenger side of the vehicle and subsequently reflects said image by means of said reflecting mirror to the driver so that visualization of this area by the driver is provided.

2. The vehicular visual safety device of claim 1 wherein the means for affixing the main frame to the internal surface of a vehicle windshield comprises two adjustable mounting arms and an articulating arm, said adjustable arms and articulating arm are each provided with a suction cup device at one terminus for affixation to the windshield, and a means at the opposite terminus for fixation to the main frame.

3. The vehicular safety device of claim 2 wherein one of the suction cup devices are affixed to one terminus of each of the adjustable arms and one terminus of the articulating arm with a ball and socket type joint, the other terminus of the articulating arm being affixed to the main frame by means of a ball and socket joint, the articulating arm having an articulating joint approximately midway between its termini, and the adjustable arms being affixed to said main frame by means of a nut and bolt, said bolt passing through a slot defined by the right and left lateral surfaces of said main frame wherein said articulating arm and said adjustable arms provide adjustability for the main frame so as to allow proper angulation of the device with windshields of differing rake.

4. The vehicular visual safety device of claim 1 wherein said object and said reflecting mirror are affixed to said inferior surface of said main frame by means of a ball and socket type joint.

5. The vehicular visual safety device of claim 1 wherein said object and reflecting mirrors are affixed within a mirror housing frame, a ball member of a ball and socket joint being affixed to a superior surface of said mirror housing frame, said ball member articulating with one of two socket members affixed to the inferior surface of the main frame so that both the object and reflecting mirrors are fully adjustable throughout said ball and socket joints rotation.

6. A vehicular visual safety device for vehicles utilizing left side driver controls comprising:
   a main frame having a superior, inferior, forward, aft, right lateral and left lateral surface, said main frame further having two parallel adjustment slots aligned parallel to, and equidistant from said lateral surfaces of said main frame, said main frame also having an aperture for the fixation of a ball member of a ball and socket type joint extending from a position located approximately midway between the right and left lateral surfaces, at the forward, superior surface of said main frame and said main frame having two socket members of two ball and socket joints extending from the inferior surface of the main frame, one of said socket members being affixed to the forward right portion of the inferior surface of the main frame, and the other of said socket members being located along the aft portion of the inferior surface of the main frame;
   two adjustable mounting arms, each consisting of a calibrated extension rail having a socket member of a ball and socket joint at one terminus of said extension rail, and said extension rail containing an adjustment bolt of a diameter less then the width of the adjustment slots on the main frame, so that the adjustment bolt passes through said adjustment slot, and adjustment nut calibrated to engage the adjustment bolt after said adjustment bolt is passed through the adjustment slot so as to hold the extension rail in a fixed relation to the main frame, the ball of the ball and socket joint is attached to the socket member of the adjustable mounting arms at one terminus and attached to a resilient suction cup at its opposite terminus, said resilient suction cups providing adhesion of the device to the inside surface of a vehicle windshield;

an articulating support arm consisting of two support rails, each support rail defining a support rail aperture at one end, a support arm bolt of a diameter less than the support rail aperture, a support arm nut calibrated to engage the support arm bolt so that when the support arm bolt is passed through both support rail apertures the support arm nut engages the support rails which are affixed to each other at an adjustable angulation, each support rail having at its terminus opposite the support rail aperture a socket member of a ball and socket joint, one socket articulating with the ball member affixed to the superior surface of the main frame and the other socket articulating with a ball member affixed to a resilient suction cup;

a convex object mirror element consisting of a mirror housing frame, a ball member of a ball and socket joint, said ball member articulating with the one of said two socket members affixed to the inferior surface of the main frame at the forward right position of the main frame and said ball member being affixed to a midpoint of an upper edge of the mirror housing frame, a convex object mirror supported and affixed to the mirror housing frame so that the convex object mirror element is freely adjustable through rotation in its relation to the main frame;

a planar reflecting mirror element consisting of a planar housing frame, a ball member of a ball and socket joint, said ball member being affixed to the planar housing frame at a position located at about the midpoint of an upper edge of the planar housing frame, said ball member articulating with the socket member located on the inferior surface of the main frame approximating the aft portion of said main frame, a planar reflecting mirror mounted and affixed to the planar housing frame so that the planar reflecting mirror is freely adjustable through rotation in its relation to the main frame wherein the convex object mirror has a spherical radius of curvature sufficient to provide an image of a blind spot located lateral, forward and below the windshield on the passenger side.

7. A vehicular visual safety device for vehicles utilizing right side driver controls comprising:

a main frame having a superior, inferior, forward, aft, right lateral and left lateral surface, said main frame further having two parallel adjustment slots aligned parallel to, and equidistant from said lateral surfaces of said main frame, said main frame also having an aperture for the fixation of a ball member of a ball and socket type joint extending from a position located approximately midway between the right and left lateral surfaces, at the forward, superior surface of said main frame and said main frame having two socket members of two ball and socket joints extending from the inferior surface of the main frame, one of said socket members being affixed to the forward left portion of the inferior surface of the main frame, and the other of said socket members being located along the aft portion of the inferior surface of the main frame;

two adjustable mounting arms, each consisting of a calibrated extension rail having a socket member of a ball and socket joint at one terminus of said extension rail, and said extension rail containing an adjustment bolt of a diameter less then the width of the adjustment slots on the main frame, so that the adjustment bolt passes through said adjustment slot, an adjustment nut calibrated to engage the adjustment bolt after said adjustment bolt is passes through the adjustment slot so as to hold the extension rail in a fixed relation tot he main frame, the ball of the ball and socket joint is attached to the socket member of the adjustable mounting arms at one terminus and attached to a resilient suction cup at its opposite terminus, said resilient suction cups providing adhesion of the device to the inside surface of a vehicle windshield;

an articulating support arm consisting of two support rails, each support rail defining a support rail aperture at one end, a support arm bolt of a diameter less than the support rail aperture, a support arm nut calibrated to engage the support arm bolt so that when the support arm bolt is passed through both support rail apertures and the support arm nut engages the support rails which are affixed to each other at an adjustable angulation, each support rail having at its terminus opposite the support rail aperture a socket member of a ball and socket joint, one socket articulating with the ball member affixed to the superior surface of the main frame and the other socket articulating with a ball member affixed to a resilient suction cup;

a convex object mirror element consisting of a mirror housing frame, a ball member of a ball and socket joint, said ball member articulating with the one of said two socket members affixed to the inferior surface of the main frame at the forward left position of the main frame and said ball member being affixed to a midpoint of an upper edge of the mirror housing frame, a convex object mirror supported and affixed to the mirror housing frame so that the convex object mirror element is freely adjustable through rotation in its relation to the main frame;

a planar reflecting mirror element consisting of a planar housing frame, a ball member of a ball and socket joint, said ball member being affixed to the planar housing frame at a position located at about the midpoint of an upper edge of the planar housing frame, said ball member articulating with the socket member located on the inferior surface of the main frame approximating the aft portion of said main frame, a planar reflecting mirror mounted and affixed to the planar housing frame so that the planar reflecting mirror is freely adjustable through rotation in its relation to the main frame wherein the convex object mirror has a spherical radius of curvature sufficient to provide an image of a blind spot located lateral, forward and below the windshield on the passenger side.

* * * * *